Oct. 25, 1932.  H. W. FAUS  1,884,636
FREIGHT HANDLING APPARATUS
Filed June 20, 1928   3 Sheets-Sheet 1
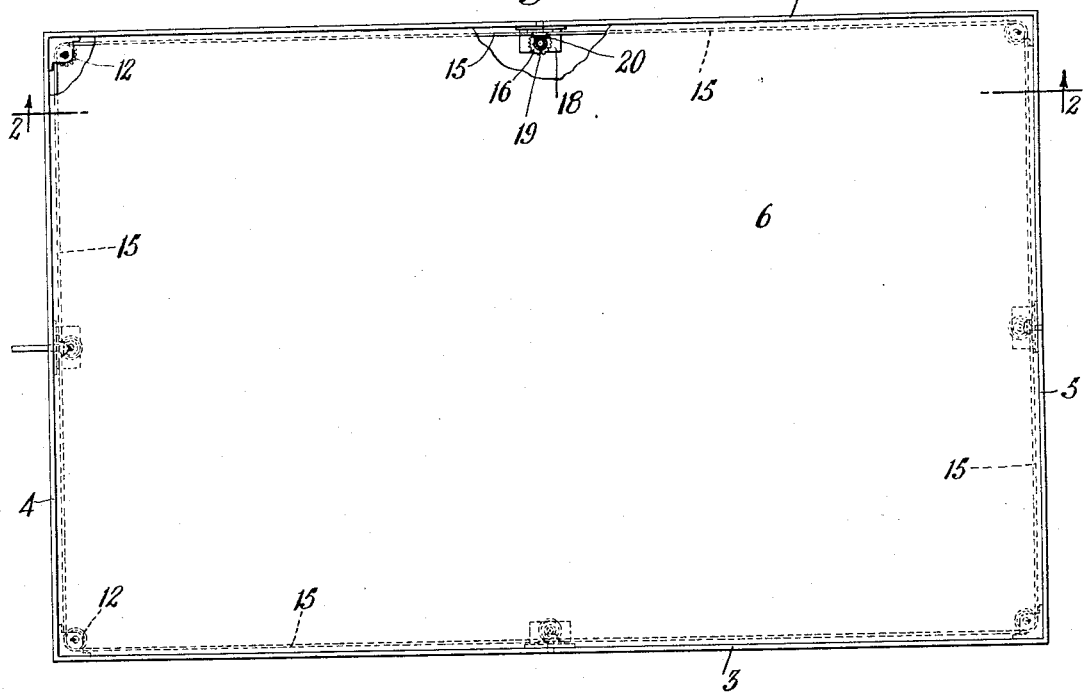
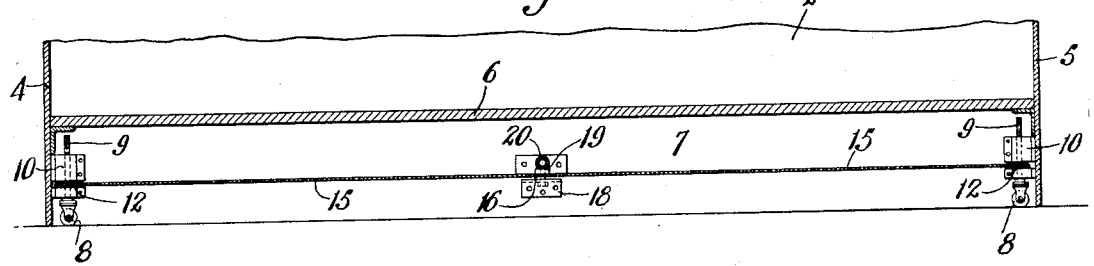
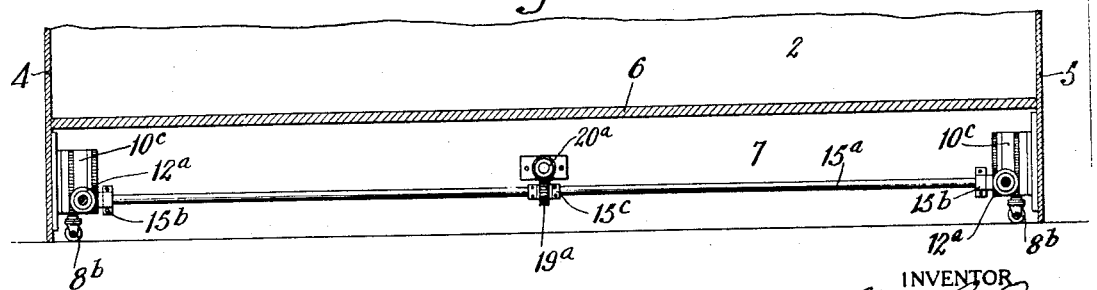

Oct. 25, 1932.  H. W. FAUS  1,884,636
FREIGHT HANDLING APPARATUS
Filed June 20, 1928  3 Sheets-Sheet 2
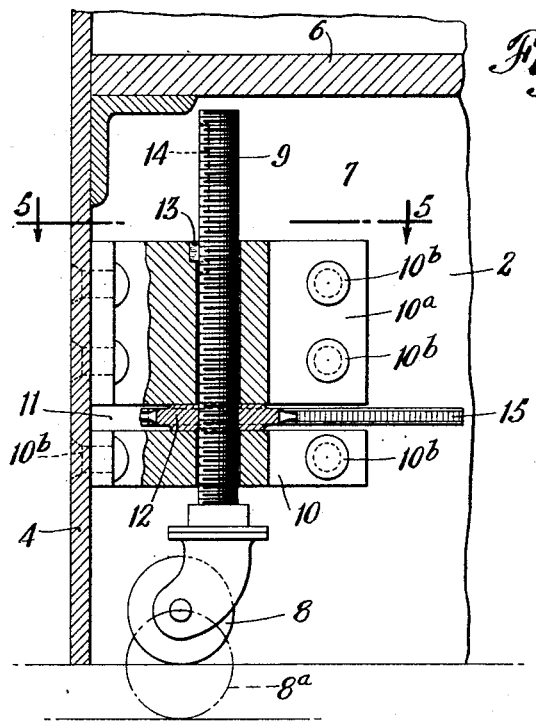
Fig: 4.
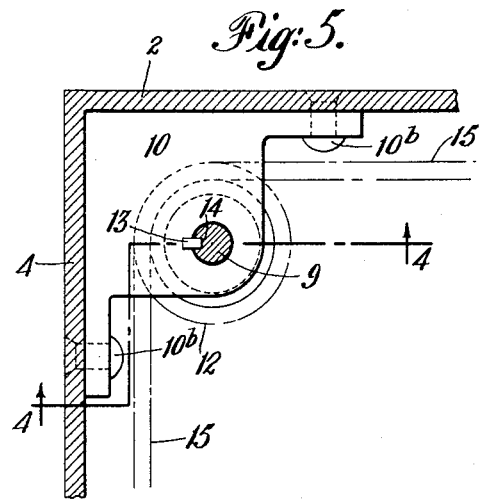
Fig: 5.
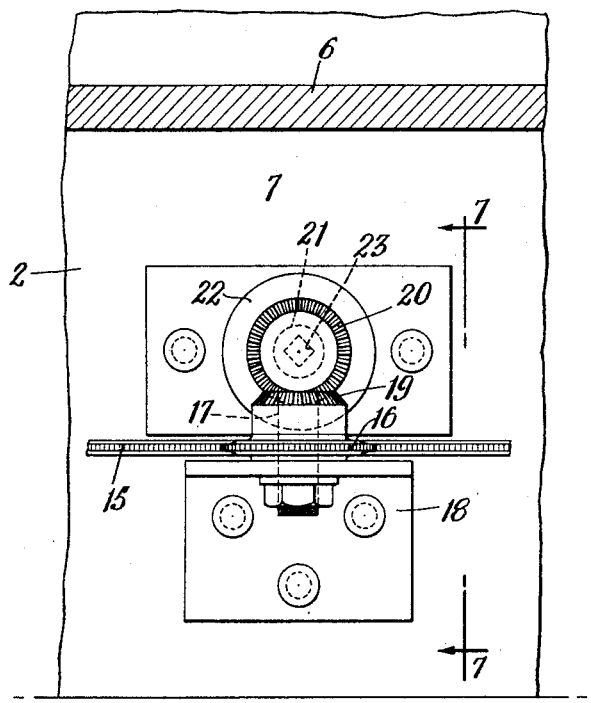
Fig: 6.
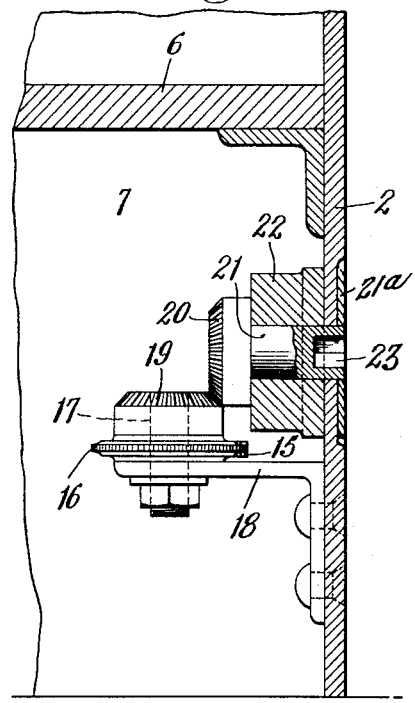
Fig: 7.
INVENTOR
Herbert W. Faus
BY
ATTORNEYS

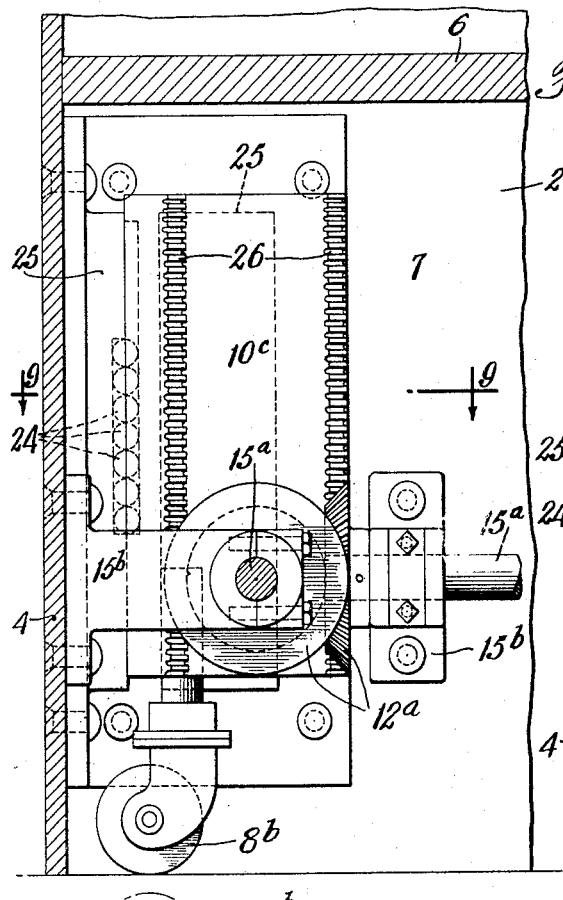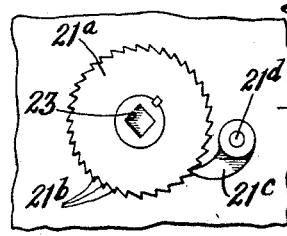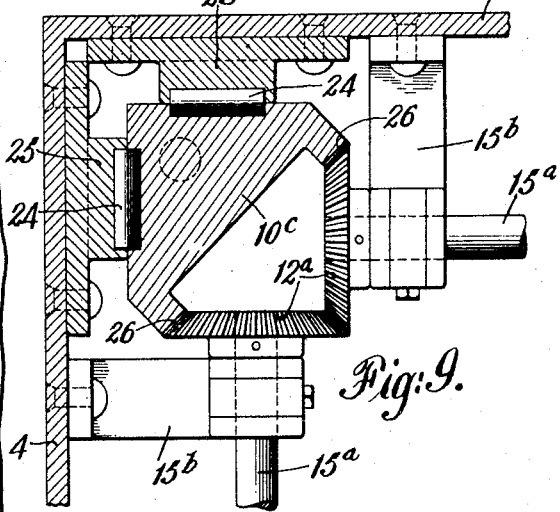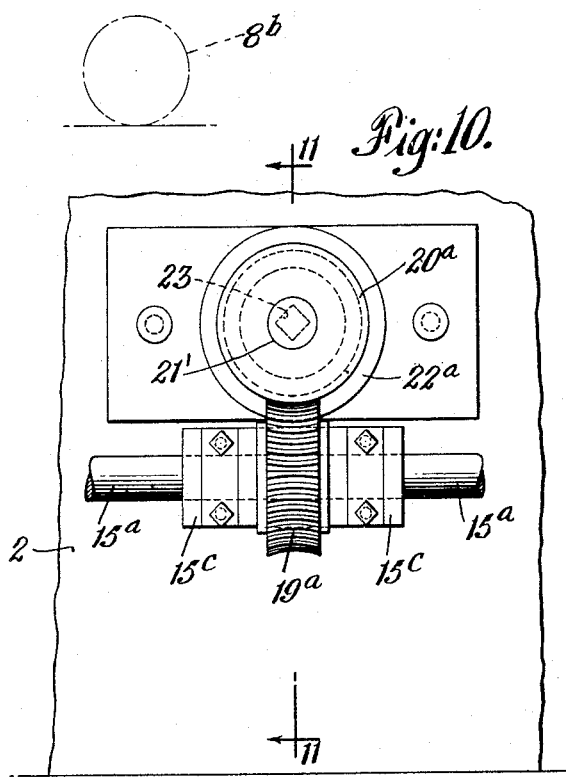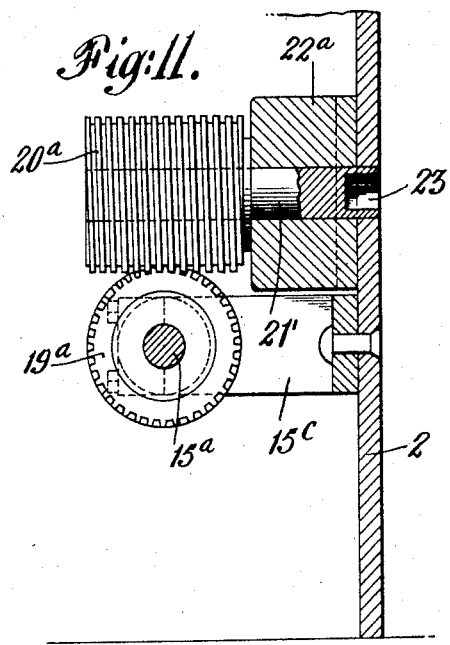

Patented Oct. 25, 1932

1,884,636

UNITED STATES PATENT OFFICE

HERBERT W. FAUS, OF WHITE PLAINS, NEW YORK

FREIGHT HANDLING APPARATUS

Application filed June 20, 1928. Serial No. 287,019.

This invention relates to freight handling apparatus, and more particularly to apparatus for handling, packing, shipping, loading, and unloading, freight or merchandise in less than carload lots.

In handling freight, particularly in less than carload lots, and especially commodities such as household goods and general merchandise, large boxes or containers are sometimes utilized, for the reason that such containers may be conveniently loaded with goods by the shipper, transported to freight cars, ships, warehouses or piers by truck, placed in cars or vessels for carriage, and then delivered intact to the consignee by truck at the proper destination.

Their scope of usefulness has, however, been severely limited by virtue of the necessity of employing cranes or hoists for lifting them on and off the various vehicles and moving them about. Furthermore, they have not hitherto been successfully mounted on wheels for the reason that this deprives them of one of their greatest advantages, namely, stability and resistance to undesired movement or shifting when loaded on any vehicle.

They must be designed to remain where placed and to require a minimum of external bracing to accomplish this end. For this reason, and also to economize space, they must be packed tightly together in the vehicle. The latter requirement makes it impossible to obtain ready access to all sides or corners of a container, when unloading it from a car or truck, in order to place wheels or rollers thereunder, and in consequence has made it practically impossible to ship them except in open-top cars or vehicles.

I aim by my invention to overcome these difficulties and disadvantages, and in general to simplify the handling and increase the usefulness of freight or merchandise containers, to minimize shifting of and damage to freight in transit, and thus to reduce the dangers to life and property encountered in freight handling and shipping, to speed up freight handling and reduce the cost thereof.

More specifically, the invention contemplates the provision of an improved freight containing device which may be rendered mobile or immobile at will; which permits of such change even where access may be had to but one side thereof; which may be handled and operated by one man; which is capable of the introduction or withdrawal of wheel supporting means at all four corners simultaneously and by a single operation; which may be constructed in a variety of shapes and sizes and packed closely into any available space; which may readily be handled and shipped in any type of vehicle, open or closed; which may easily be pushed or pulled on or off cars, platforms, trucks, etc. and into and out of warehouses; and which will retain its fixed or mobile condition until positively altered.

How I accomplish the foregoing objects and advantages, and others which are incident to the invention or will occur to those skilled in the art, will clearly appear hereinafter, reference being had to the accompanying drawings, in which:

Fig. 1 is a plan view, with parts broken away, of one form of my freight handling apparatus, which I have termed a "mobilator";

Fig. 2 is a fragmentary section on the line 2—2 of Fig. 1, showing two rollers and part of their actuating means;

Fig. 3 is a view similar to Fig. 2 of a device embodying a modified form of the invention;

Fig. 4 is an enlarged vertical sectional view of the portion of the device shown at the left of Fig. 2, with certain parts in elevation and others broken away, taken on line 4—4 of Fig. 5;

Fig. 5 is a horizontal section on the line 5—5 of Fig. 4;

Fig. 6 is an enlarged fragmentary view of Fig. 2, illustrating in detail the middle portion of said figure;

Fig. 7 is a vertical section on the line 7—7 of Fig. 6, with some parts in elevation and others broken away;

Fig. 8 is an enlarged fragmentary view of the left-hand portion of Fig. 3;

Fig. 9 is a horizontal section on the line 9—9 of Fig. 8;

Fig. 10 is an enlarged fragmentary view of Fig. 3, illustrating in detail the middle portion of said figure;

Fig. 11 is a vertical section on the line 11—11 of Fig. 10; and

Fig. 12 is an elevation of a detail of construction applicable to both forms of the invention and is taken in a direction corresponding to a side view of either Fig. 7 or Fig. 11.

Referring first to Figures 1, 2 and 4 to 7, it will be seen that I have illustrated a freight container having sides 2 and 3, ends 4 and 5, and a floor or bottom 6 which is located somewhat above the bottom edges of the ends and sides. The working parts of the device are housed in the space 7 below said floor or false bottom 6.

Positioned within the space 7, and preferably at the four corners thereof, are rollers or wheels 8 each mounted for up and down movement. To this end, as seen in Figs. 4 and 5, I have secured each roller to a threaded rod or shaft 9 vertically movable in a hole extending through the fixed block or bracket 10 which may be secured by flanges 10a and rivets 10b to the sides of the container. The blocks 10 may each be slotted transversely or made in two parts, as shown, to provide a recess 11 for receiving the internally threaded rotatable gear or sprocket 12 mounted on shaft 9. The shaft is held as against rotative movement by the fixed key 13 engaging slot 14 in the shaft.

The four sprockets 12 are connected, as by an endless chain 15, with four similar sprockets 16 (see particularly Figs. 6 and 7) located at the sides, each midway between two corners, and mounted for rotation on pins 17 supported by fixed brackets 18. On each pin 17, and fixed with relation to the respective sprocket 16, is a bevel gear 19 in operative engagement with a similar gear 20 mounted on a pin 21 rotatable in the bearing 22, said pin extending to or through a hole in the respective side of the container and having means by which it may be rotated, such, for example, as the squared hole 23 (shown in Fig. 7) into which a hand-operated crank or wrench may be inserted.

It will now be seen that by rotating any one of the four pins or shafts 21 (through the medium of any suitable tool, such as a hand crank) the four rollers 8 may be lowered to the position 8a (see Fig. 4) simultaneously, whereby the bottom of the container is raised above the floor and the container is supported at its four corners on the said rollers, for free movement from place to place. Furthermore, the container may be moved against a wall or into a corner, or tightly packed between other containers, and yet may be readily lowered so as to become once more immobile or raised again on its wheels, even though access may be had to but one side thereof.

By reference now to Figs. 3, and 8 to 11, it will be seen that I have illustrated another embodiment of the invention in which the rollers 8b are fixed in vertically-movable blocks 10c, which, as seen in Fig. 9, may advantageously be of substantially triangular cross section. Each block 10c, on two sides, rides against the roller bearings 24 pocketed in the fixed bearing supports 25, and on the third side has a pair of racks 26 with which the inter-meshing bevel gears 12a engage, said gears being fixed on the ends of shafts 15a.

Each of the four shafts 15a is supported, for rotation, by brackets 15b at its ends, and by brackets 15c adjacent worm gear 19a, said worm gear being fixed on the shaft midway of its ends. A worm 20a (see Fig. 11) engages each worm gear and is mounted fixedly on a shaft or pin 21' revoluble in bearing 22a, said pin having a squared socket 23 exactly as in the case of the pin 21 shown in Fig. 7.

The operation of this form of the invention will be quite evident without further description, and it will also be obvious that it attains the same advantages as does the construction first described.

In either form of the invention particularly if the threads of shaft 9 (Fig. 4) or the worm 20a (Fig. 11) be formed on a very steep pitch for the purpose of obtaining rapid up and down movement of the rollers, there may be some tendency for a heavily loaded container, when in raised position, to disturb its own adjustment. For this reason I prefer to secure to each actuating pin having the crank socket 23, a ratchet wheel 21a, as shown in Figs. 7 and 12, with the teeth 21b of which a dog 21c is adapted to engage. The dog is pivotally mounted on the side of the container at 21d in such a way that gravity will swing the dog to inoperative position upon a slight turn of the ratchet wheel. This arrangement insures absolute control over the raising and lowering mechanism of the entire container provided access can be had to any one side, for, even though one or more dogs on inaccessible sides of the container may have been inadvertently left in engaged position, all dogs will fall into release position when the load is removed by a slight turn of the crank inserted in the accessible side of the container.

Various modifications of the device may be made, such as substituting sheaves and cables in place of the sprocket and chain mechanism, or reducing or increasing the number of sides of the container, or altering the number or form of the rollers, and so on, all without departing from the spirit and scope of this invention.

What I claim is:—

1. Freight handling apparatus comprising a container with a floor and several sides extending below the floor to provide an immobile supporting portion, wheel supports therefor adapted to be extended vertically below the bottom of the extended sides thereof or retracted at will, and actuating means for the latter operable from any one of a plurality of the sides of the container.

2. Freight handling apparatus comprising a container with several sides, wheel supports therefor adapted to be extended by vertical reciprocation from above to below the bottom thereof or retracted at will, and actuating means for the latter operable from any one of a plurality of the sides of the container, together with locking means adapted to maintain said supports in extreme or intermediate adjusted positions.

3. Freight handling apparatus comprising a container with several sides, wheel supports therefor adapted to be extended below the bottom thereof or retracted at will, and actuating means for the latter operable from any one of a plurality of the sides of the container, together with locking means releasable from any side of the container and adapted to maintain the position of said supports.

4. A freight handling container having sides and a bottom, wheels housed within the space below said bottom, and means extending along the periphery of the bottom for simultaneously reciprocating said wheels vertically to engage a subjacent supporting surface and raise said container.

5. A freight handling container having sides and a bottom disposed above the lower edges of said sides, wheels housed in the space within the sides below said bottom, and means for lowering said wheels to engage a subjacent supporting surface, said means being accessible from any one of a plurality of the sides of the container.

6. A freight handling container having sides, the lower edges of which normally serve for the immobile support thereof, a plurality of roller supports, normally disposed above the lower edges of said sides, adapted to be lowered to a position below the lower edges of the sides for movably supporting said container, actuating means interconnecting them and adapted to actuate them simultaneously, and means whereby said actuating means may be operated from any one of a plurality of sides of the container.

7. A freight handling container having a plurality of roller supports adapted to be raised and lowered, actuating means interconnecting them and adapted to actuate them simultaneously, releasable locking means whereby adjustment of the supports may be maintained, and means for operating said actuating means from any one of a plurality of sides of the container.

8. In apparatus of the character described, a box-like container comprising a floor and sides extended below said floor, wheels mounted between said sides and below the floor, each adjacent a bottom corner thereof for movement between a point where it will support the container and a point where it will not support it, actuating means, enclosed by said sides below the floor, extending from said wheels around the peripheral portion of the container to a point intermediate a plurality of corners, and means whereby said actuating means may be operated from said intermediate point, said actuating means affecting simultaneously all the wheels equally.

9. In apparatus of the character described, a box-like container, wheels mounted each adjacent a bottom corner thereof for vertical reciprocation between a point where it will support the container and a point where it will not support it, actuating means extending from said wheels to a point at a side intermediate a plurality of corners and constructed to affect simultaneously all the wheels equally, and means whereby said actuating means may be operated from said intermediate point including a device adapted to receive a hand tool.

10. A freight container comprising a floor and sides extended below said floor so that the lower edges thereof normally engage a supporting surface and having a rotatable member at each of a plurality of points around its sides, reciprocable threaded shafts with wheels mounted between the sides and below the floor of the container, and constructed to be lowered, with respect to the container, to supporting position, and driving means including gear means threaded on said shafts for operatively connecting said shafts with said rotatable members.

11. A freight container comprising a floor and sides extending from above to below said floor, and having a rotatable member below the floor at each of a plurality of points around its sides, wheeled supporting means for the container constructed to be raised, with respect to the container, to be within the space between said sides below the floor, out of supporting position, and driving means connecting said wheeled supporting means with said rotatable members for effecting the lowering of the wheeled supporting means and consequent raising of the container, each of said members having means of engagement with a turning tool.

12. A freight container comprising a floor and sides extending below said floor, and having a rotatable member at each of a plurality of points around its sides, wheeled supporting means for the container constructed to be raised, with respect to the container, out of supporting position, and driving means connecting said wheeled supporting means with said rotatable members, each of said members being located within the outside limits of said sides.

13. A freight container having a floor, sides depending therebelow, and wheeled supporting means, and means whereby said supporting means may be vertically reciprocated, whereby it extends below, or is disposed above, the lower edges of said sides, and is rendered operative or inoperative, as a support, at will, said means being operable from any one of a plurality of sides of the container.

14. A freight container comprising a floor and side walls extending above and below said floor, and having wheeled supporting means, and means whereby said supporting means may be disposed below or above the lower edges of said walls, and thereby rendered operative or inoperative, as a support, at will, all of said means being housed within the outside limits of the container.

In testimony whereof I have hereunto signed my name.

HERBERT W. FAUS.